R. R. & H. PARRY.
APPARATUS FOR WASHING DISHES AND OTHER ARTICLES.
APPLICATION FILED DEC. 15, 1913.

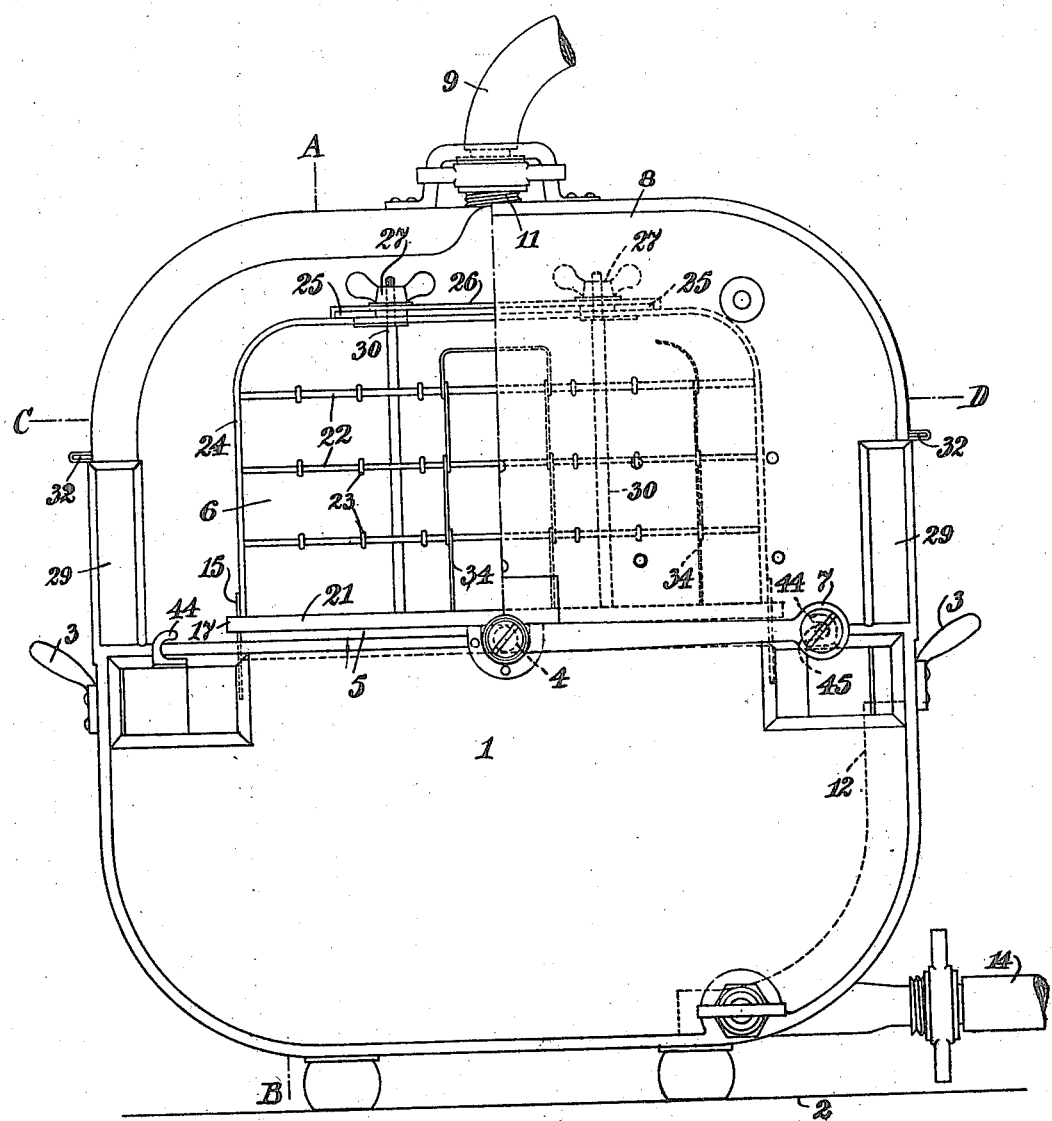

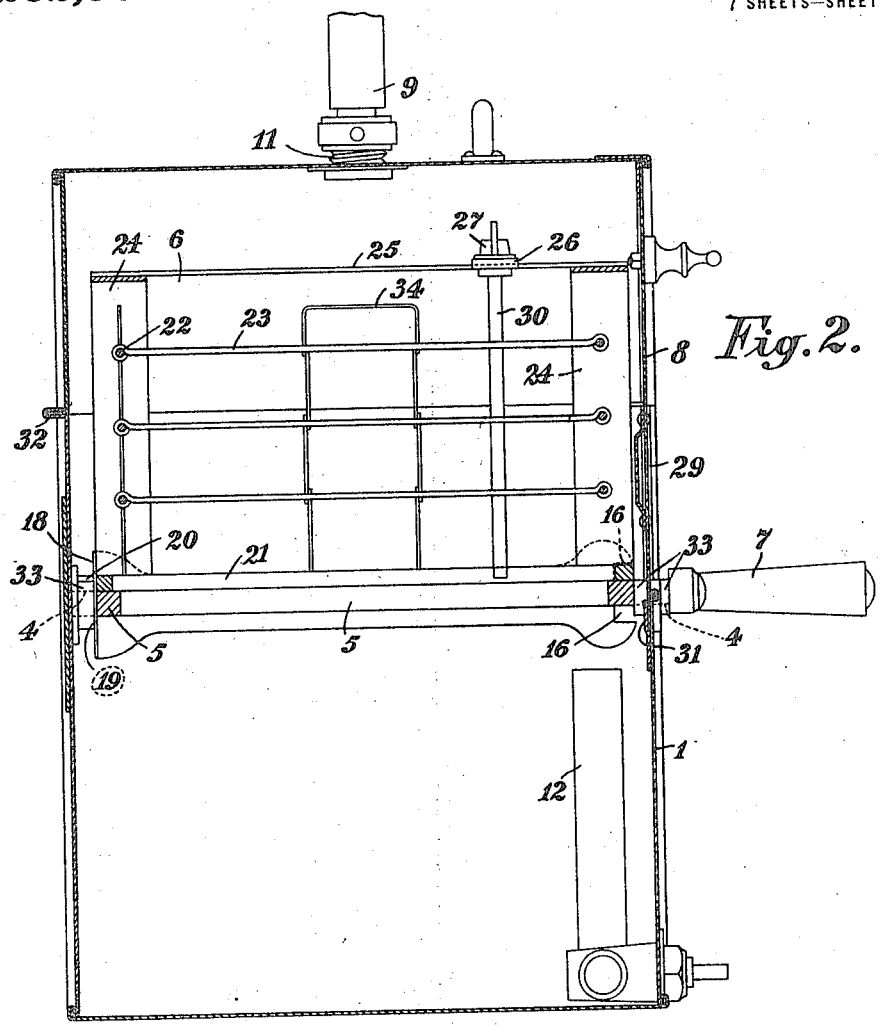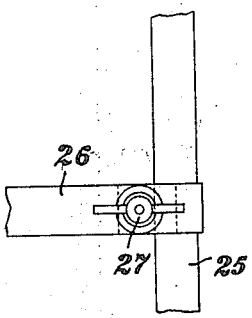

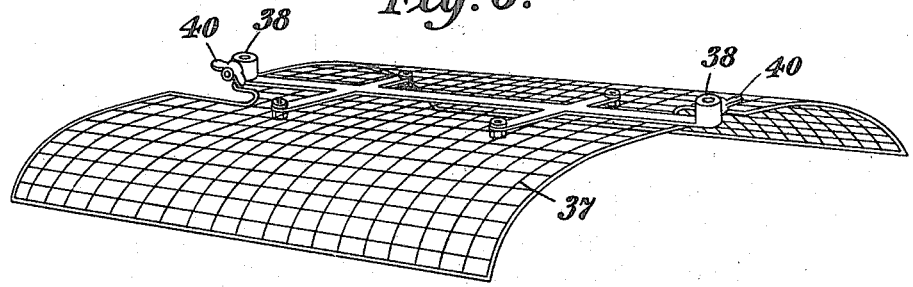
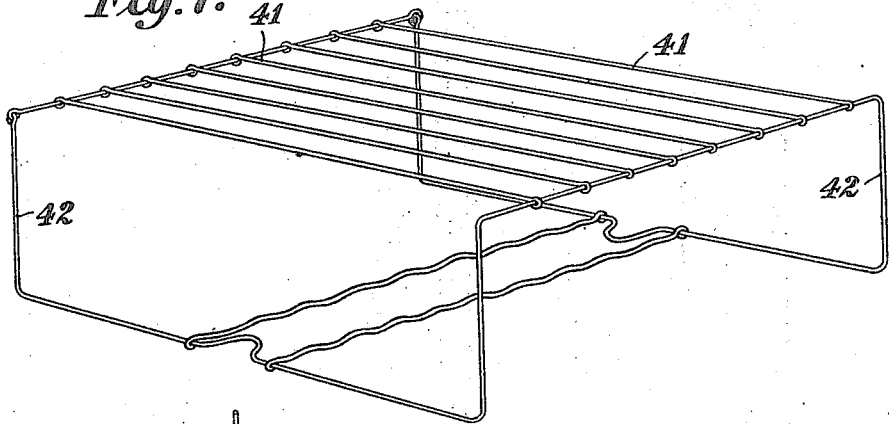
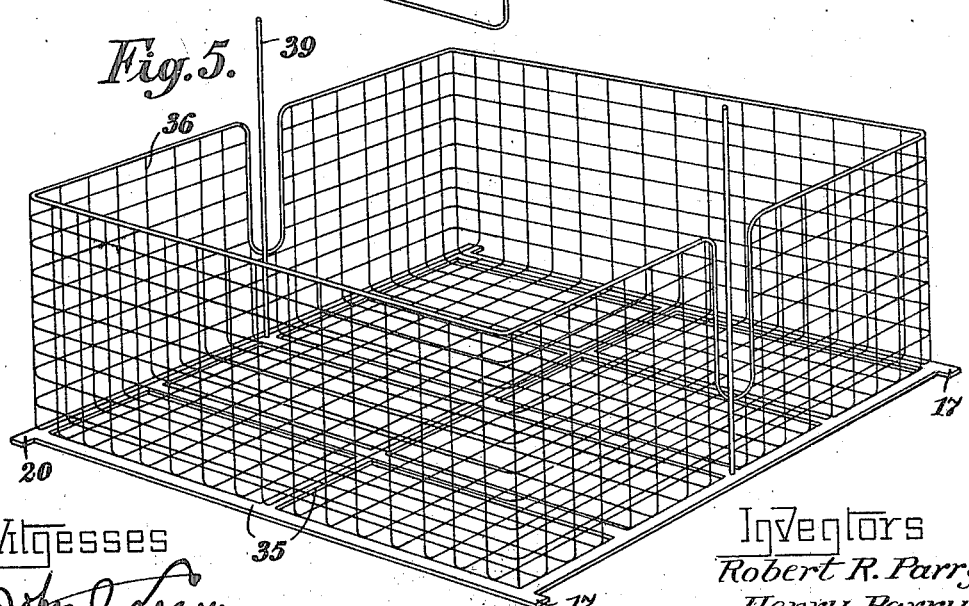

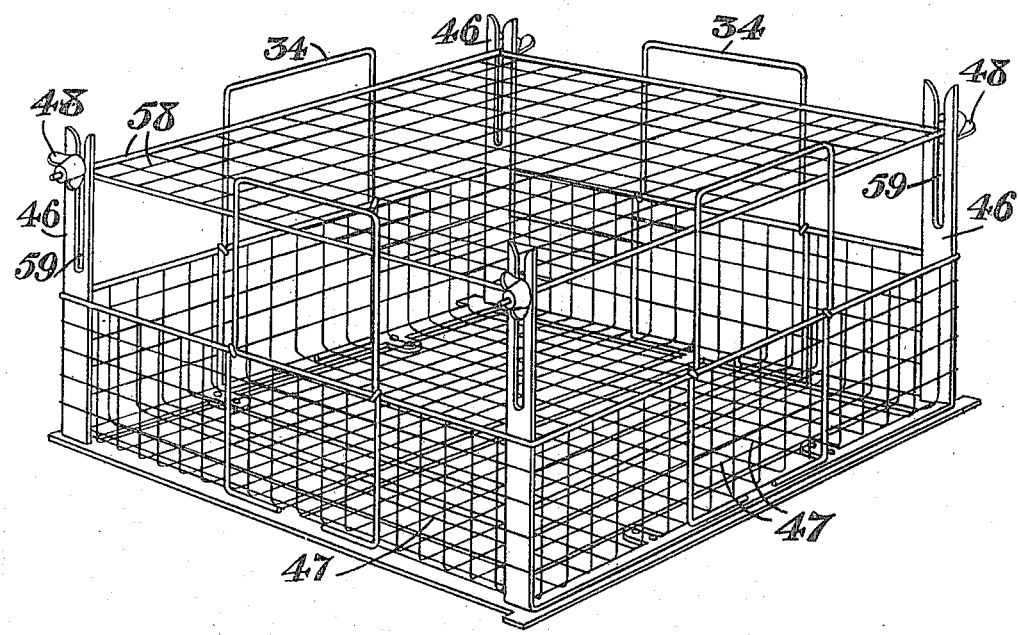

1,232,964.

Patented July 10, 1917.
7 SHEETS—SHEET 6.

Witnesses

Inventors
Robert R. Parry
Henry Parry,
By their Attorney

R. R. & H. PARRY.
APPARATUS FOR WASHING DISHES AND OTHER ARTICLES.
APPLICATION FILED DEC. 15, 1913.

1,232,964.

Patented July 10, 1917.
7 SHEETS—SHEET 7.

Witnesses

Inventors
Robert R. Parry,
Henry Parry,
By their Attorney

UNITED STATES PATENT OFFICE.

ROBERT R. PARRY, OF NEW YORK, N. Y., AND HENRY PARRY, OF FAIRFIELD, LIVERPOOL, ENGLAND.

APPARATUS FOR WASHING DISHES AND OTHER ARTICLES.

1,232,964.   Specification of Letters Patent.   Patented July 10, 1917.

Application filed December 15, 1913. Serial No. 806,812.

*To all whom it may concern:*

Be it known that we, ROBERT R. PARRY and HENRY PARRY, subjects of the King of Great Britain, residing at New York, in the county and State of New York, United States of America, and Fairfield, Liverpool, in the county of Lancaster, in the Kingdom of England, respectively, have invented certain new and useful Improvements in Apparatus for Washing Dishes and other Articles, of which the following is a specification.

This invention relates to apparatus destined for the mechanical washing of dishes and other tableware, in which the several articles to be cleaned are exposed to the cleaning action of water, or water suitably prepared for dissolving the fat or other deposits on the dishes.

Such invention relates to that type of construction in which the receptacles for holding the dishes or other articles are caused to be carried through or immersed in the water, or fat dissolving solution contained in a tank, and to alternately emerge therefrom, in such manner that the water repeatedly impinges against the dishes each time the latter are immersed.

In this type of machine the trays for holding the dishes have been suspended by hangers from a pair of wheels mounted one on each side within a tank, the rotation of the wheels carrying the hanging trays through the tank and the trays remaining upright in all positions; while in other types, the dishes always remain in the water and do not emerge at all until the washing operation is finished.

Our invention is designed to provide certain improvements in apparatus for the mechanical washing of dishes, by which the dishes contained in the receptacle are caused to act as dashers or paddles which splash the water about inside the tank, and cause it to impact with some force against them, and by which the articles alternately pass through the body of water in the tank, and through the spray caused by the dashing or splashing action. The invention is further characterized by this, that journaled within a tank supplied with water and provided with a hood like cover, is a cradle which can be rotated about an axis from the outside, and to the opposite faces of which, holding parts or carriers loaded with dishes or other table ware are attached in a removable manner, so that the rotation of the cradle about its axis will alternately cause the carriers to become immersed in the tank in an inverted position, and in a right side up position in the hood like cover. These and other features of the invention will be understood from the following description, reference being had to the accompanying drawings, in which:—

Figure 1 is a side elevation of a washing machine embodying the present invention, half of which shows the door removed and the other half the door in position;

Fig. 2 is a cross section on the line A B of Fig. 1;

Figure 9:
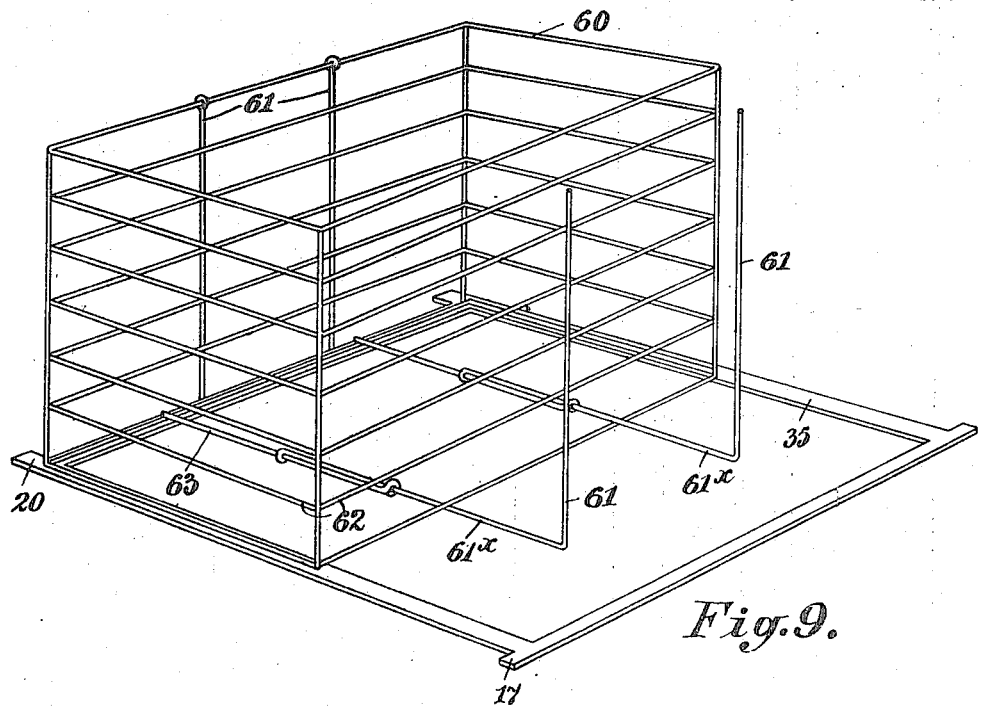

Fig. 4, a fragmentary view of the locking device for the retaining rods;

Fig. 5 is a perspective view of a carrier for receiving saucers and plates, Fig. 6 a view of the lid therefor, and Fig. 7 a perspective view of one of its shelves;

Fig. 8 is a perspective view of a carrier employed for receiving cups or other table ware;

Fig. 9, a perspective view of a carrier for receiving plates and saucers;

Fig. 10 is a perspective view of the frame or cradle to which the dish-holders or carriers are attached.

Figure 3:
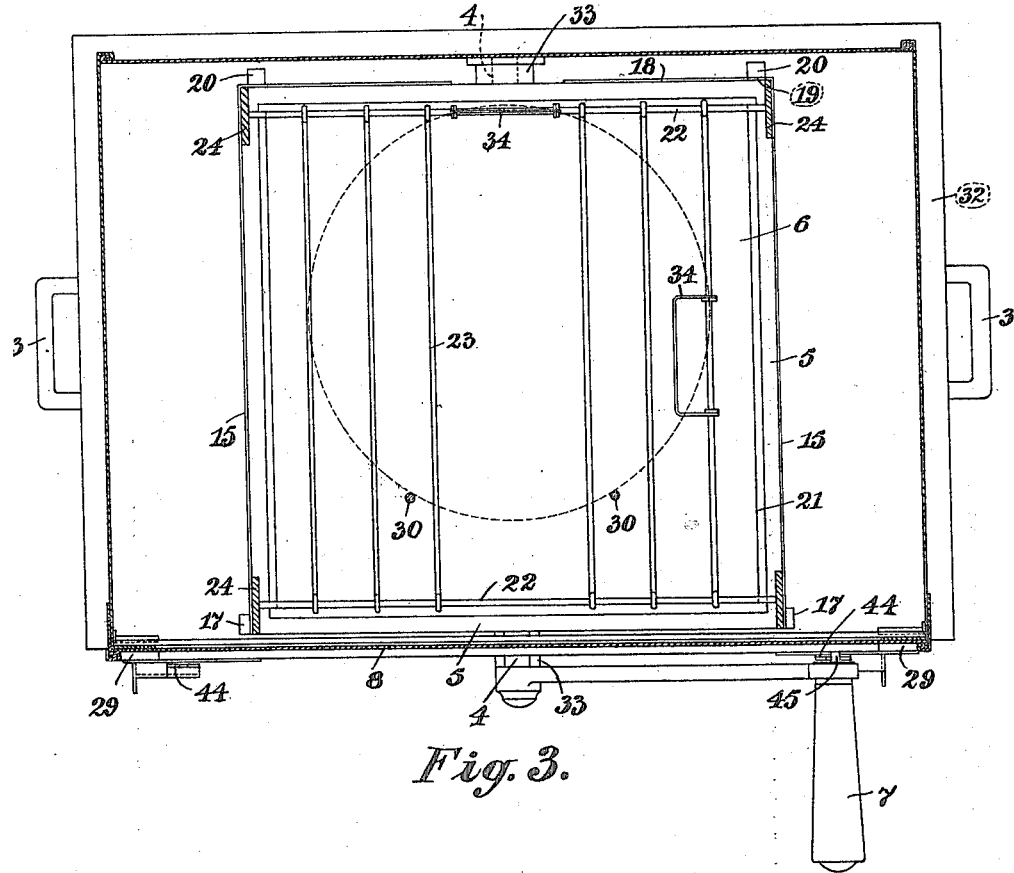
Fig. 3 is a sectional plan view on the line C D of Fig. 1.
Figure 11:
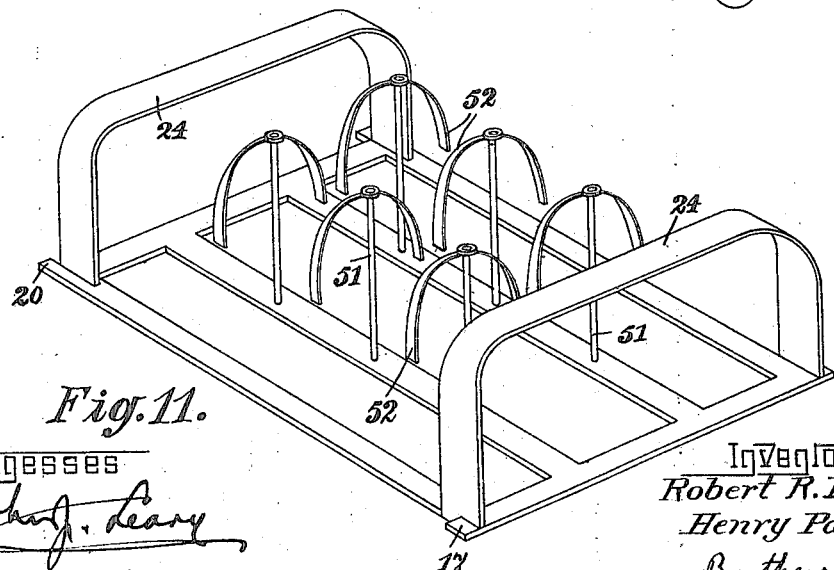
Figure 12:
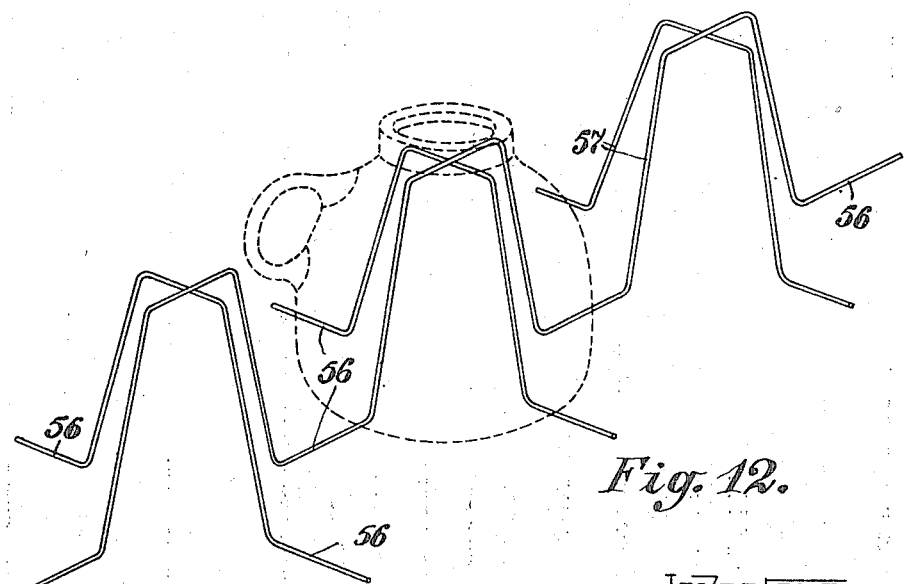

Figs. 11 and 12, perspective views of carriers for holding cups and other hollow ware.

Figure 13:
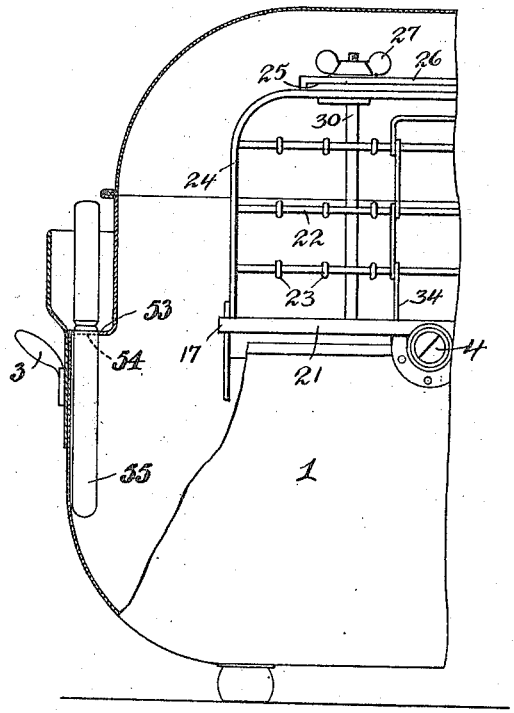
Figure 14:
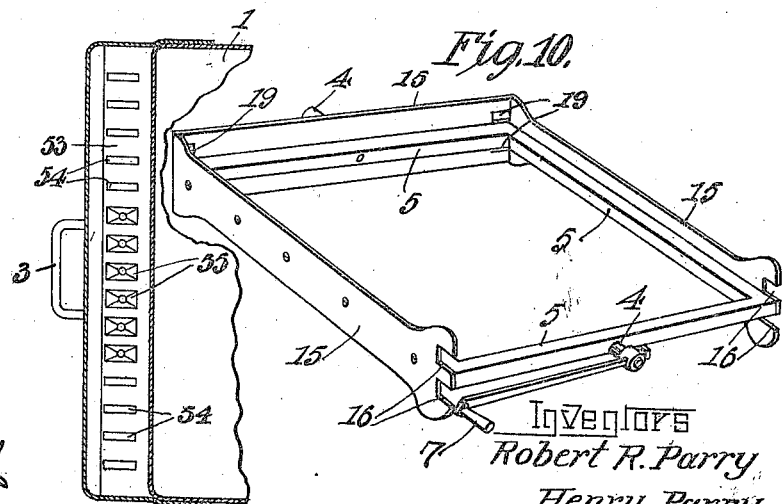

Figs. 13 and 14 are cross sectional and plan views of a modification for washing knives in the machine.

Referring first to Figs. 1, 2, 3 and 4, the machine embodying the present invention comprises a reservoir or casing 1 adapted to stand on a platform or bench 2 or even on a stove, and provided with handles 3 on the outside to facilitate it being lifted or transported. On a pair of stub shafts 4 inside this casing and journaled therein, is secured a cradle 5 (best shown in Fig. 10) for receiving two carriers 6 for supporting the articles to be cleansed. The shaft 4 at one end is supported in a journal bearing in the casing 1, and at the other extends through the wall of the casing, and is provided with a handle 7 for rotating or oscillating the cradle 5 and the carriers 6 supported thereby together with the articles placed in the latter. The casing 1 is water tight, but is provided with an opening at one side covered by a door 8. A carrier loaded with articles to be cleansed, is passed through this opening (when the door 8 is opened) into the cradle 5 inside the casing 1, so as to be engaged thereby, the handle 7 during this operation being locked in a horizontal position, so as not to obstruct the opening, and in that position locked by a sliding catch 44 engaging a pin 45 on the handle. Then the cradle 5 is turned one half turn, so that it is brought into position to receive the other carrier 6. When both carriers are in position, the door 8 is closed. A rubber pipe 9 is connected at one end with a hot water supply tap, while the other end is connected to a metal nozzle 11 in the top of the casing 1, so that when the tap is turned on, the hot water descends in a spray inside the casing on to the articles held rigidly by the carriers 6, and floods the lower part of the reservoir or casing 1 with water so that the handle 7 when turned or oscillated, causes the loaded carrier 6 to pass through the descending spray or through the hot water or both. An overflow 12 in the side of the casing 1, maintains the water in the reservoir at normal level if desired, and discharges it into a sink, while a drain pipe 14, leading from the extreme bottom of the reservoir 1, allows the water to be drained off. If the water is allowed to drain away through the overflow 12, the articles when the handle is turned, are caused to pass through the spray and through the body of water in the reservoir, as well, thus washing them. The articles furthermore act as dashers or paddles, which splash the water about inside the casing, and cause it to come with some force of impact against the plates, etc. This greatly helps to clean them. If the water is allowed to drain away through the waste pipe 14 at the extreme bottom of the reservoir, the body of water in the bottom of the reservoir is drained off, and thus when the handle is turned the articles are rinsed by being caused to pass through the spray only. If the water supply be shut off and the door 8 opened so as to admit air into the casing, then the articles when the handle is turned are drained and dried by whirling them through the air. When the articles have been sufficiently washed, the loaded carriers 6 are slid out of the cradle 5 in turn, and the articles removed. A fresh supply of unwashed tableware is then inserted in the carriers, the carriers are replaced in the cradle, and the operation is repeated.

The shaft 4 is so journaled at front and rear, that it with its cradle can readily be removed or replaced.

The cradle hereinbefore referred to embodies side members 15 spaced apart by means of an open flat rectangular frame 5, to which the stub shafts 4, are affixed, so that the rotation of the shafts will rotate the frame and its side members. These side members are perforated for the purpose hereinafter described, and they form guides for the carriers 6 one of which is placed on one face of the rectangular frame 5, and one on the other face so that two carriers are supported by the one cradle. Slots 16 are provided in the side members of the cradle at the front, to receive corresponding projections 17 on the carriers, and the said cradle has also a transverse rear plate 18 which forms a stop against which the carriers abut when pushed in between the side members 15, the said rear plate being provided with holes 19 to receive corresponding projections 20 on the carriers. By these means the carriers are locked in position in the cradle.

The carriers have different forms to suit the particular description of articles to be washed. In one arrangement they each consist of a skeleton base piece 21, from which arched members 24 spring upward, the upstanding portions of the two members being connected by cross rods 22 while wires 23 pass from rod to rod in such manner as to form a series of open mesh wirework shelves. Between these, plates, saucers, dishes and other articles are placed. The distance between these shelves is approximately the same as the depth of the articles they are designed to receive between them. The arched members 24 serve as supports for a pair of longitudinal strips 25 on which are mounted the cross strips 26, so that they can be slid along the strips 25 and be secured in any position desired by a winged nut 27. From these strips 26 depend rods 30 which are held at their upper ends by the nuts 27 also. By slackening the nuts 27 the strips 26 with the rods 30 can be slid along the strips 25, so that the rods can be moved up against the edge of the plates when in position between the shelves, and also when the nuts are tightened up hold them rigidly in place during the washing operation. By slackening the nuts 27, the rods 30 can be slid along the strips 25 clear of the plates or other articles, so as to release the plates. It is obvious however that other suitable means may be used for clamping the rods. When the articles are assembled in the carrier they will lie in a series of tiers but all freely exposed to the action of the hot water. The door 8 is adapted to slide in side guides 29 while its lower edge engages in a groove 31 in the upper edge of the front wall of the casing 1. This door forms the upper part of the front wall of the casing, and by lifting it, access can be had to the interior.

The upper part of the casing 1 is arranged as a removable hood, the adjacent edges 32 of the hood and the casing being flanged so that the hood like portion can be slid off. The front and rear of the cradle 5 lie between the ends of the journal bearings 33 in which the shaft is journaled, and hence is locked in position against longitudinal movement, while permitting of free rotation when the handle is unlocked from the sliding catch. When the handle is in the locked position, the carriers can be freely slid in and out of the casing 1, but immediately the handle is turned from the horizontal position, and the carrier turned out of register with the front opening, then the front journal bearing 33 forms a stop which prevents the carrier being slid out. This will be understood by reference to Fig. 2. In the locked position of the handle 7 there shown, the bottom of the skeleton base piece 21 of the carrier 6 is flush with the top of the front journal bearing 33, and consequently the carrier 6 can be freely slid in and out if slightly lifted to clear the boss of the handle 7, and the door 8 is opened. But when the handle is turned from the horizontal position, the base piece 21 is turned out of the plane of the top of the journal bearings 33. 34 are wire guards to form stops for the earthenware articles when inserted in the carriers.

Another form of carrier shown in Figs. 5, 6 and 7 consists of a skeleton base piece 35 with a wire work cage 36 built up thereon, and provided with a wire work lid 37, which may be removed or replaced. This lid has eye pieces 38 which fit on the upstanding rods 39 fixed to the base piece and are clamped thereto by clamping screws 40. The lid is adjustable up and down the said rods 39 and may be secured in any position thereon. Inside this wire work cage open mesh wire work shelves 41 may be placed, said shelves having downcomer portions 42 which stand on the base of the cage, the space between the wires being adapted to receive saucers, plates, et cetera, edgewise. Or instead of using a wire work lid such as 37, an open mesh wire work lid 43 may be employed (Fig. 8), the projections 58 of which enter the slots 59 in the upstanding members 46 of the cage 47, and are secured at any height required by clamping screws 48.

Fig. 9 shows a carrier for plates and other articles composed also of a wire-work cage 60 built up on a base piece 35, in such manner as to form a series of open mesh wirework shelves 62. Between these, plates, saucers, dishes and other articles are placed, the distance between the shelves being approximately the same as the depth of the articles they are designed to receive between them. This cage has upright wires 61 against which the edges of the plates impinge at the two opposite sides. One pair of these wires 61 are slidable toward or away from the other pair by means of the rods 61ˣ sliding on the guides 63, so that they can be moved up against the edge of the plates when in position between the wires 62, and so hold the plates, et cetera, rigidly in place during the washing operation.

An arrangement for washing tea-cups, tumblers, pitchers, and other hollow ware consists in providing the open mesh wire work carriers with upstanding pillars 51 (Fig. 11) to the top of which convex strips 52 are secured, and adapted to enter hollow ware receptacles. The strips are curved approximately to the shape of the interior of the hollow ware, and are made springy so that the hollow ware can be pressed down on to the convex strips and be engaged thereby in an inverted position, and such ware may be held in place by a cover secured to the up-standing pieces 24.

Another arrangement for washing tea-cups, tumblers, et cetera, is shown in Fig. 12, and consists of wires 56 bent upward at intervals and crossing each other at the bent up portions so as to form a series of open-mesh wire-work projections 57 which enter the cup or other article. In this case the bent up parts 57 need not fit inside of the cup at the sides, but the cup is held down on them by a cover.

For knives, forks, et cetera, with ivory handles and handles liable to be injured by immersion in boiling water, we provide the following arrangement, reference being had to Figs. 13 and 14,—one side of the lower part of the receptacle is made rather wider than the upper part so as to form a shelf 53. This shelf is perforated with a number of slot holes 54 of such size as to receive knife blades, 55, forks and similar tableware. Said blades project through the slots 54 into the hot water in the reservoir 1, and so become efficiently washed by the water which surges about them, while the handles remain outside.

The machine may be made of any desired size to accommodate it to the possible number of dishes or other articles to be washed, thus large sizes may be made for hotels, restaurants and the like, a smaller size for large families and a still smaller size for small families. Such machines will reduce the labor of washing dishes and other table ware to a minimum, and as the reservoir or casing is closed during the operation of washing, there is no discomfort from the splashing of water or from escaping steam.

We declare that what we claim is:—

1. In a dish-washer, the combination of a reservoir; a frame or cradle journaled therein and having openings at its opposite ends; a removable carrier for the articles to be washed, said carrier having projections interlocking with said openings; and means for holding said parts in engagement.

2. In a dish-washer, the combination of a reservoir; having an open side above the center thereof; a door for said opening; a flat frame or cradle journaled in said reservoir and having openings at opposite ends thereof; a pair of carriers detachably mounted on opposite sides of said cradle, each carrier comprising a skeleton base piece provided with projections adapted to interlock with the openings in the cradle, and a skeleton frame rising from the base piece, said frame being adapted to hold the articles to be washed; and means, external of the reservoir, for rotating the cradle and its allied parts.

3. In a dish-washer, the combination of a reservoir; a flat frame or cradle journaled therein; a door arranged to close an opening formed in said reservoir above the journal of the frame; a pair of dish-carriers detachably secured upon opposite sides of the frame, each carrier comprising a base, a skeleton frame arising from the base, and adjustable means extending inwardly into the frame for holding the dishes in place therein; and means, external of the reservoir, for rotating the cradle and its allied parts.

4. In a dish-washer, the combination of a reservoir, having the upper portion of one side thereof open; a door for closing said opening; a frame or cradle located within the reservoir; journals for said frame, one of said journals being in line with that wall of the reservoir which defines the lower portion of the opening aforesaid; dish-supporting members adapted to be slid inwardly through said opening; and means carried by said members interlocking with the cradle and serving to hold the parts in place.

5. In a dish-washer, the combination of a closed reservoir provided with a laterally-projecting offset at one side thereof, said offset having slots therein for the introduction of knife-blades or the like; and rotatable dish-holding means mounted within the reservoir, whereby upon movement of said means, the fluid within the reservoir will be agitated and caused to flow in contact with said blades or the like.

6. In a dish-washer, the combination of a reservoir; a cradle journaled therein, said cradle comprising a rectangular frame, having a pair of diametrically opposed side bars secured thereto, the bars being notched at their forward ends; a dish-holding device comprising a frame adapted to rest upon the cradle and to engage the notches aforesaid and likewise to pass through openings formed in the rear portion of the cradle; and means, located exteriorly of the reservoir, for rotating the cradle and the dish-holding device.

7. A dish-holder for washing machines, comprising a skeleton framework having a series of shelves formed from the wires or rods which compose the framework, and a plurality of retaining bars or members standing at right angles to the shelves and movable laterally with reference thereto for securing dishes in position upon the shelves.

In witness whereof, we have hereunto signed our names this 5 day of Dec. 1913, in the presence of two subscribing witnesses.

ROBERT R. PARRY.
HENRY PARRY.

Witnesses:
G. C. DYMOND,
T. S. SHILLINGTON.

Copies of this patent may be obtained for five cents each, by addressing the "Commissioner of Patents, Washington, D. C."